United States Patent [19]

Sakuragi

[11] Patent Number: 5,199,102

[45] Date of Patent: Mar. 30, 1993

[54] IMAGE PROCESSING APPARATUS HAVING MULTIPLE DISPLAY AREAS FOR EDITING

[75] Inventor: Hiroshi Sakuragi, Ageo, Japan

[73] Assignee: Kabushiki Kaisha Toshiba, Kawasaki, Japan

[21] Appl. No.: 841,763

[22] Filed: Feb. 28, 1992

Related U.S. Application Data

[63] Continuation of Ser. No. 428,621, Oct. 30, 1989, abandoned.

[30] Foreign Application Priority Data

Oct. 31, 1988 [JP] Japan ................................ 63-275639

[51] Int. Cl.$^5$ ............................................. G06F 15/62
[52] U.S. Cl. .................................... 395/139; 395/133; 395/164
[58] Field of Search ................... 364/518–523; 340/721, 747; 358/452, 448; 395/145–148, 155–161

[56] References Cited

U.S. PATENT DOCUMENTS 4,667,248  5/1987  Kanno ................................ 358/452
4,942,479  7/1990  Kanno ................................ 358/448

Primary Examiner—Gary V. Harkcom
Assistant Examiner—Almis Jankus
Attorney, Agent, or Firm—Finnegan, Henderson, Farabow, Garrett and Dunner

[57] ABSTRACT

An image processing apparatus comprises a cathode ray tube (CRT) display device including a substantially square display region, the display region having a first display area for displaying a first image at a first magnification, a second display area for displaying a second image at a second magnification different from the first magnification, and a third display area for displaying a third image at a third magnification different from the first magnification memories for sequentially storing image information of images including the first, second and third images and a central processing unit (CPU) for retrieving the image information of the first, second, and third images, stored in the storing means, and permitting these images to be displayed in the first, second, and third display areas, respectively, in the order in which information of the first, second and third images are stored in a subsidiary storing means. The first through third display areas are rectangular and are arranged in the display region such that longer sides of the first and second display areas are parallel to a longer side of the third display area while being spaced from the longer side of the third display area by a predetermined distance.

1 Claim, 4 Drawing Sheets

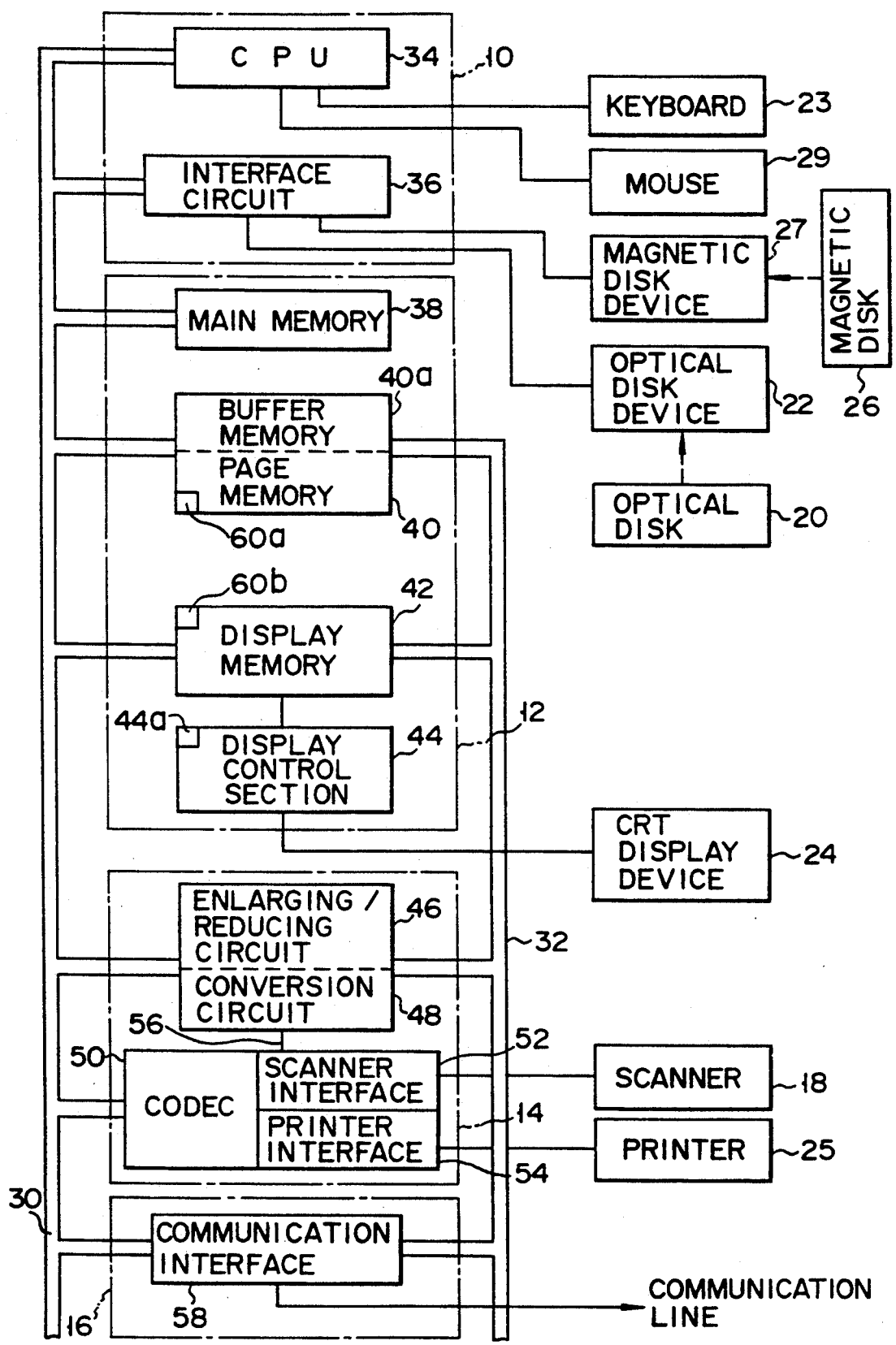
F I G. 2

IMAGE PROCESSING APPARATUS HAVING MULTIPLE DISPLAY AREAS FOR EDITING

This application is a continuation of application Ser. No. 07/428,621, filed Oct. 30, 1989, now abandoned.

BACKGROUND OF THE INVENTION

1. Field of the Invention

The present invention relates to an image processing apparatus, such as an image filing apparatus, for storing, retrieving, and editing image data.

2. Description of the Related Art

In recent years, an image filing apparatus has been put to practical use. In the image filing apparatus, images of a large number of documents are read by optically scanning them in two dimensions by use of a two-dimensional scanner, and are stored in an optical disk. An arbitrary one of the images is retrieved and read out of the optical disk when necessary, and is output to an output device (such as a CRT display device or a printer), for visual confirmation.

A conventional image filing apparatus is designed to permit a document to be edited by use of the corresponding image retrieved from the optical disk. For example, the retrieved image of the document can be rotated, changed in size (namely, enlarged or reduced), and/or combined with another. However, when the image is retrieved or edited, the CRT display device of the apparatus shows only the image which is being processed since it has only one display screen. Since, therefore, the operator cannot easily know the context of the displayed image, he cannot easily decide how to edit the image or which image should be retrieved next. In short, the conventional apparatus does not permit the image to be efficiently retrieved or edited.

SUMMARY OF THE INVENTION

Accordingly, an object of the present invention is to provide an image processing apparatus which permits a single-screen display means to show not only an image which is being processed but also an image which was previously processed, and which therefore enables efficient processing of an image.

BRIEF DESCRIPTION OF THE DRAWINGS

FIG. 2 is a block circuit diagram schematically illustrating the construction of the apparatus;

DETAILED DESCRIPTION OF THE PREFERRED EMBODIMENT

Figure 1:
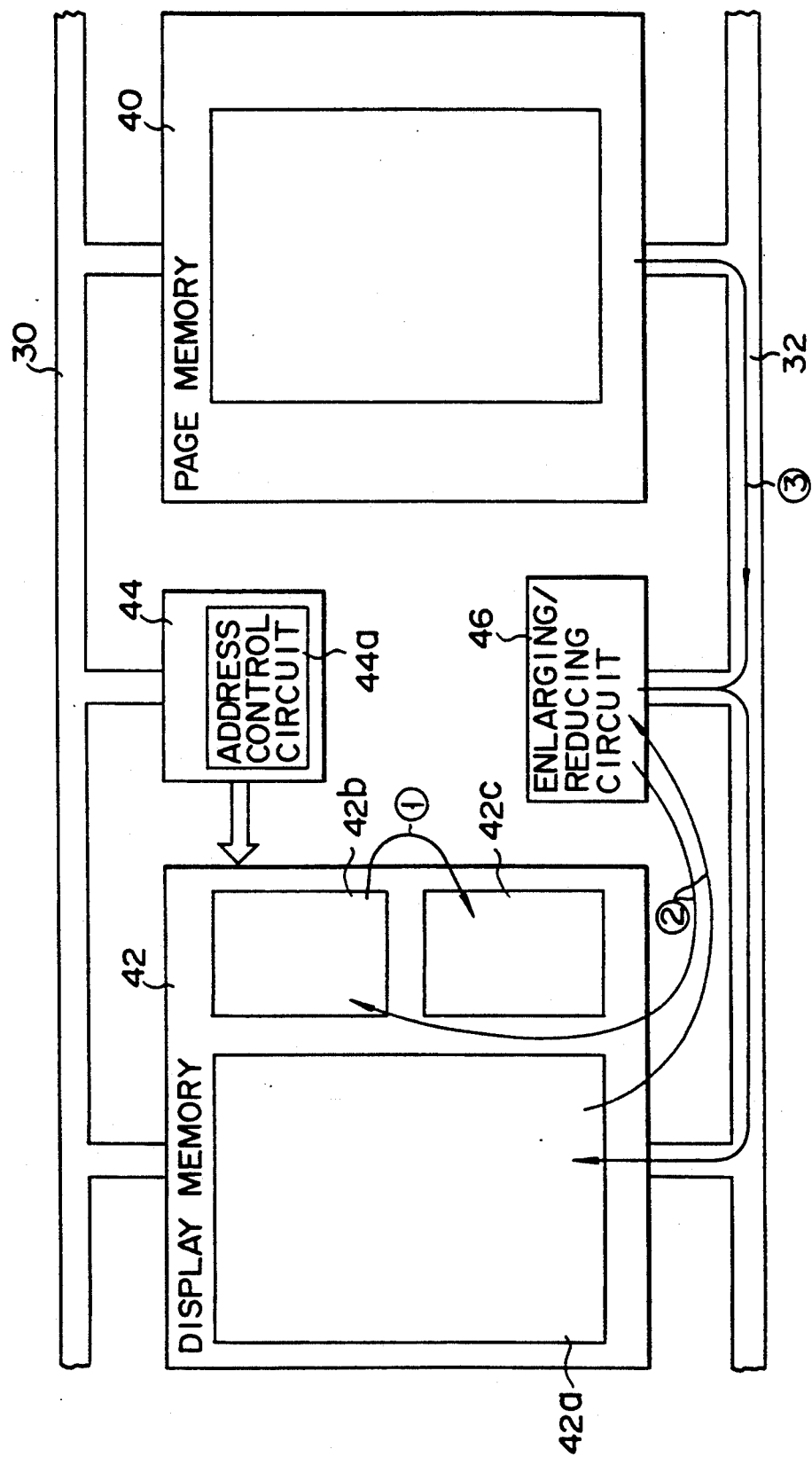
FIG. 1 is an illustration of the main portion of the apparatus.

FIG. 2 shows an image filing apparatus (i.e., an image processing apparatus) embodying the present invention. The image filing apparatus comprises control module 10, memory module 12, image processing module 14, communication control module 16, scanner 18, optical disk 20, optical disk device 22, keyboard 23, CRT display device 24 (i.e., display means), printer 25, magnetic disk 26, magnetic disk device 27, mouse 29, system bus 30, and image bus 32.

Control module 10 is made up of CPU 34 (i.e., control means) for performing various kinds of control, so as to store, retrieve, and edit an image, and interface circuit 36 for connecting both optical and magnetic disk devices 22 and 27 to CPU 34. Keyboard 23 and mouse 29 are also connected to CPU 34.

Memory module 12 is made up of the following elements: main memory 38 used for storing control programs of various kinds (e.g., programs by which to control the storing, retrieving, editing, etc. of an image), control information, or the like; page memory 40 (i.e., storing means) which has a storage capacity corresponding to several A4-sized pages of an original and which is used as an image memory; display memory 42 used as a display interface; display control section 44 (i.e., control means); and address generators 60a and 60b provided in correspondence to page and display memories 40 and 42, respectively. Page memory 40 includes buffer memory region 40a. The data writing and data reading with reference to buffer memory region 40a are controlled by use of a counter (not shown). Page memory 40 is used, e.g., for temporarily storing image data or image information to be stored in optical disk 20 and image data read out therefrom. Normally, page memory 40 is adapted to process images of 400 pixels per inch of A3 size. If an additional memory element is connected to page memory 40, page memory 40 can process images of 400 pixels per inch of A1 size.

Display memory 42 is used for storing image data obtained by adding modifications (such as enlargement, reduction, rotation, insertion and reversion) to the image which is stored in page memory 40 and which is actually shown on the entirety of square display region A of display window 24A (see FIGS. 4 and 5) of CRT display device 24. Display control section 44 performs control needed for showing an image on CRT display device 24. Display control Section 44 also produces, in an automatic mode, a copy of the image data stored in display memory 42.

Figure 3:
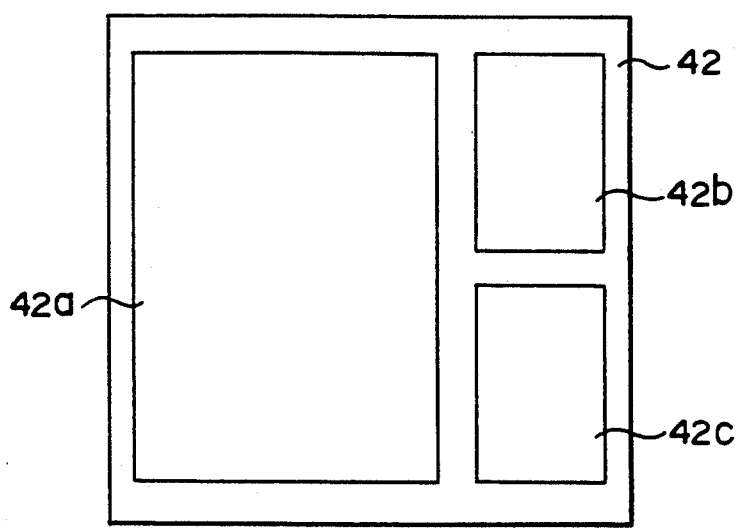
FIG. 3 is an explanatory sketch of the storage areas of a display memory.

Display memory 42 includes rectangular storage areas 42a, 42b and 42c, as is shown in FIG. 3. These storage areas store, e.g., an image which is to be edited, an image last edited, and an image edited immediately theretofore, each of said images illustratively having its long dimension vertical.

Image processing module 14 is made up of the following elements: enlarging/reducing circuit 46 used for enlarging or reducing an image; conversion circuit 48 used for rotating the image by converting ts ordinates to abscissas and vice versa; compression/expansion circuit 50 (i.e., a CODEC) for encoding the image for image compression (by which to reduce the redundancy of the image data) or for image expansion (by which to restore the redundancy); scanner interface 52 used for scanner 18; printer interface 54 used for printer 25; and internal bus (interface) 56. Through internal bus (interface) 56, enlarging/reducing circuit 46 and conversion circuit 48 are connected to compression/expansion circuit 50, scanner interface 52 and printer interface 54. Compression/expansion circuit 40 uses the MH (Modified Huffman) method, the MR (Modified Read) method, or the like, so as to perform band width compression or band width expansion.

Communication control module 16 is constituted by communication interface 58, which is exemplified by a BCP (Bus Communication Processor) connected to a LAN or the like. Alternatively, communication control module 16 may be constituted by a UCP (i.e., a Universal Communication Processor) connected to an external device (such as a personal computer) through an FCP (i.e., a facsimile connector) or an interface. Communication control module 16 supplies retrieval information which it receives through a communication line to main memory 38, or outputs the image corresponding to the retrieval information. Further, it supplies an image to be recorded on optical disk 20 to page memory 40, and supplies the retrieval information corresponding to the image to main memory 38.

System bus 30 is a bus through which control signals of the devices are supplied and which connects control module 10, memory module 12, image processing module 14 and communication control modules 16 together. Image bus 32 is a bus through which images are supplied and which connects memory module 12, image processing module 14 and communication control module 16 together.

Scanner 18 is a two-dimensional scanner or the like and produces an electric signal corresponding to the image of an original (or a document) by scanning the original in two dimensions with a laser beam.

Optical disk device 22 sequentially stores images read by scanner 18 on optical disk 20. Optical disc device also retrieves the image corresponding to the retrieval information designated by use of keyboard 23 or the like.

Keyboard 23 is used for entering retrieval information corresponding to images to be stored on optical disk 20. It is also used for entering commands for commanding the start of various operations, such as storing, retrieving and editing operations. Mouse 29 is used for vertically or horizontally moving a cursor (not shown) on display window 24a of CRT display device 24, and for selecting or entering the command indicated by the cursor. For example, the operating mode of the apparatus, the region designation for image edition, and icons are selected by use of mouse 29.

Figure 4:
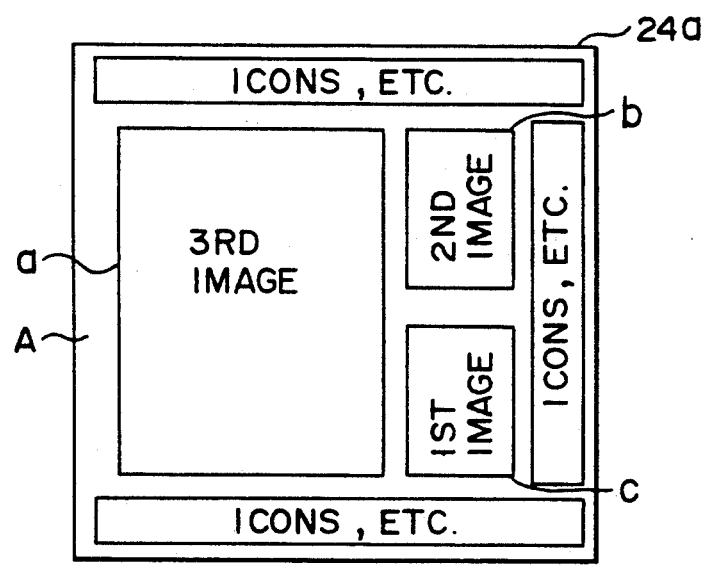
FIGS. 4 and 5 show examples of what is shown in display region A.
Figure 5:
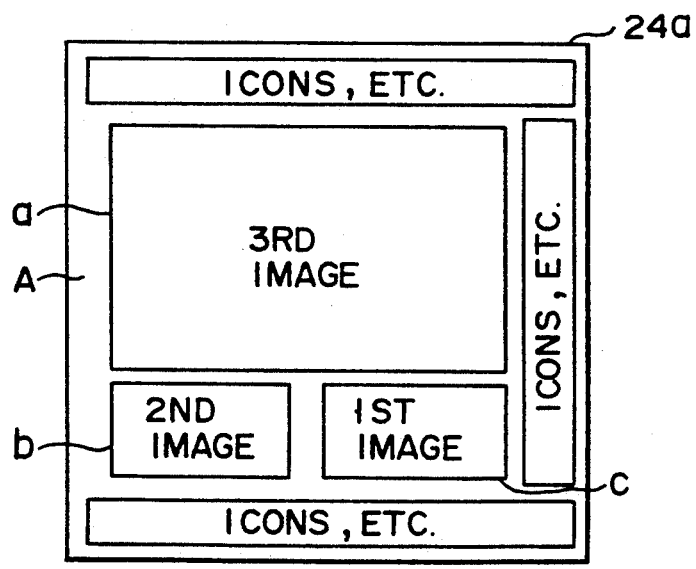

CRT display device 24 has a box-like shape and is used for displaying an image read by use of scanner 18 or an image retrieved from optical disk 20. Icons or other pieces of control information are shown on the upper, lower and right sides of display window 24a (which has a substantially square shape) of CRT display device 24. Display region A for displaying the whole of an image comprises substantially all of display window 24a. Where a horizontally-longer or vertically-longer image (3rd image) is displayed on display region A, an image (1st image) last displayed and an image (2nd image) displayed immediately theretofore are also displayed in the remaining portions of display region A, with their sizes reduced to ½. More specifically, where a vertically-longer image to be edited is displayed, the previously-displayed images are reduced in size to ½ and are displayed such that they are aligned in the vertical direction b, c in FIG. 4. Where a laterally-longer image to be edited is displayed, the previously-displayed images are reduced in size to ½ and are displayed such that they are aligned in the lateral direction b, c in FIG. 5. For example, the vertically-longer or laterally-longer image is displayed in area a (i.e., the first display area), while the previously-displayed images are displayed in areas b and c, as is shown in FIGS. 4 and 5, respectively.

CRT display device 24 is of a multi-window type, wherein display area a can show up to four images at one time in different display windows (not shown). The image shown on one display window can be edited, enlarged, reduced, rotated, or scrolled, independently of the images shown on the other display windows.

Printer 25 is used for printing out, or producing a hard copy of, an image read by scanner 18, an image retrieved from optical disk 20, or an image displayed on CRT display device 24.

Magnetic disk device 27 is used for storing various control programs on magnetic disk 24. It is also used for storing retrieval information entered through keyboard 23, and retrieval data pertaining to the image corresponding to the retrieval information. The retrieval data represents an address designating that location of optical disk 20 at which an image is stored, and the size of the image.

A description will now be given, with reference to the illustration shown in FIG. 1, as to how to change the storage positions at which an image to be edited, an image last displayed, and an image displayed immediately theretofore are stored in display memory 42. First, an image to be processed is retrieved and read out of optical disk 20, and is then stored in page memory 40. Before this image is output from page memory 40 to display memory 42, CPU 34 supplies a copy command to display control section 44, so as to produce a copy of the image. In response to the copy command, display control section 44 designates a read address and a write address by use of address control circuit 44a. On the basis of the read and write addresses, the image retrieved immediately theretofore and stored in storage area 42b of display memory 42 is copied, and a copy of the image is stored in storage area 42c corresponding to display area c, as indicated by "1" in FIG. 1. Next, CPU 34 designates a read address by use of address control circuit 44a of display control section 44, so as to output the image retrieved last time from storage area 42a to enlarging/reducing circuit 46. After being reduced in size to 1/2, the image is supplied to display memory 42. At this time, CPU 34 designates a write address by use of address control circuit 44a, so as to store the size-reduced image in storage area 42b. (This operation is indicated by "2" in FIG. 1.) Thereafter, the image stored in page memory 40 is reduced in size to 80% by enlarging/reducing circuit 46 and is supplied to display memory 42. At this time, CPU 34 designates a write address by use of address control circuit 44a, so as to store the 80%-size image, which is supplied from enlarging/reducing circuit 46 and is to be edited, in storage area 42a corresponding to display area a of display memory 42. (This operation is indicated by "3" in FIG. 1.) In this fashion, the images which have been stored in storage areas 42a, 42b and 42c of display memory 42 are displayed on CRT display device 24, respectively, such that the image which has been retrieved for editing is shown in display area a at the 80% size-reduction rate, and such that the image last retrieved and the image retrieved immediately theretofore are shown in display areas b and c, respectively, at the 50% size reduction.

Next, a description will be given of the image-storing and image-retrieving operations performed by the image filing apparatus. First, the image-storing operation will be explained. By use of keyboard 23, the operator first sets the apparatus in the storing mode and then enters retrieval information corresponding to an image which the operator wants to store on optical disk 20. The retrieval information includes retrieval keys representing a plurality of data items. In accordance with a predetermined format, CPU 34 checks the validity of the retrieval information entered by the operator. Further, CPU 34 compares the entered retrieval information with the retrieval information already stored in optical disk 20, for the prevention of double registration. In accordance with this comparison, the retrieval information entered by the operator is stored in main memory 38.

After an original is set on scanner 18, CPU 34 actuates both optical disk device 22 and scanner 18. Scanner 18 scans the image on the original in two dimensions and photoelectrically converts the image into line information in a sequential manner. The line information obtained by this conversion is stored in page memory 40. The image stored in the form of line information is also stored in display memory 42, and is thus displayed on CRT display device 24. The operator checks the image displayed on CRT display device 24 in light of skew, image density, resolution, etc. If the operator regards the image as being satisfactory, he operates a memory key (not shown). In response to the operation of the memory key, CPU 34 causes compression/expansion circuit 50 to band-compress the image stored in page memory 40 in units of one piece of line information by use of a well-known MR (Modified Read) method. In this fashion, the image is encoded. The encoded image is supplied to optical disk device 22 and is stored on optical disk 20 by optical disk device 22.

After the image is stored on optical disk 20 in this fashion, CPU 34 associates the image length, image attributes and other pieces of image data (which are expressed by a logical address and a block length determined on the basis of the physical track and sector addresses where the image is stored) with a retrieval code (or retrieval data), and stores the retrieval code in main memory 38. Thereafter, CPU 34 supplies the retrieval data from main memory 38 to magnetic disk device 27. Magnetic disk device 27 stores the supplied retrieval data in magnetic disk 26.

Figure 6:
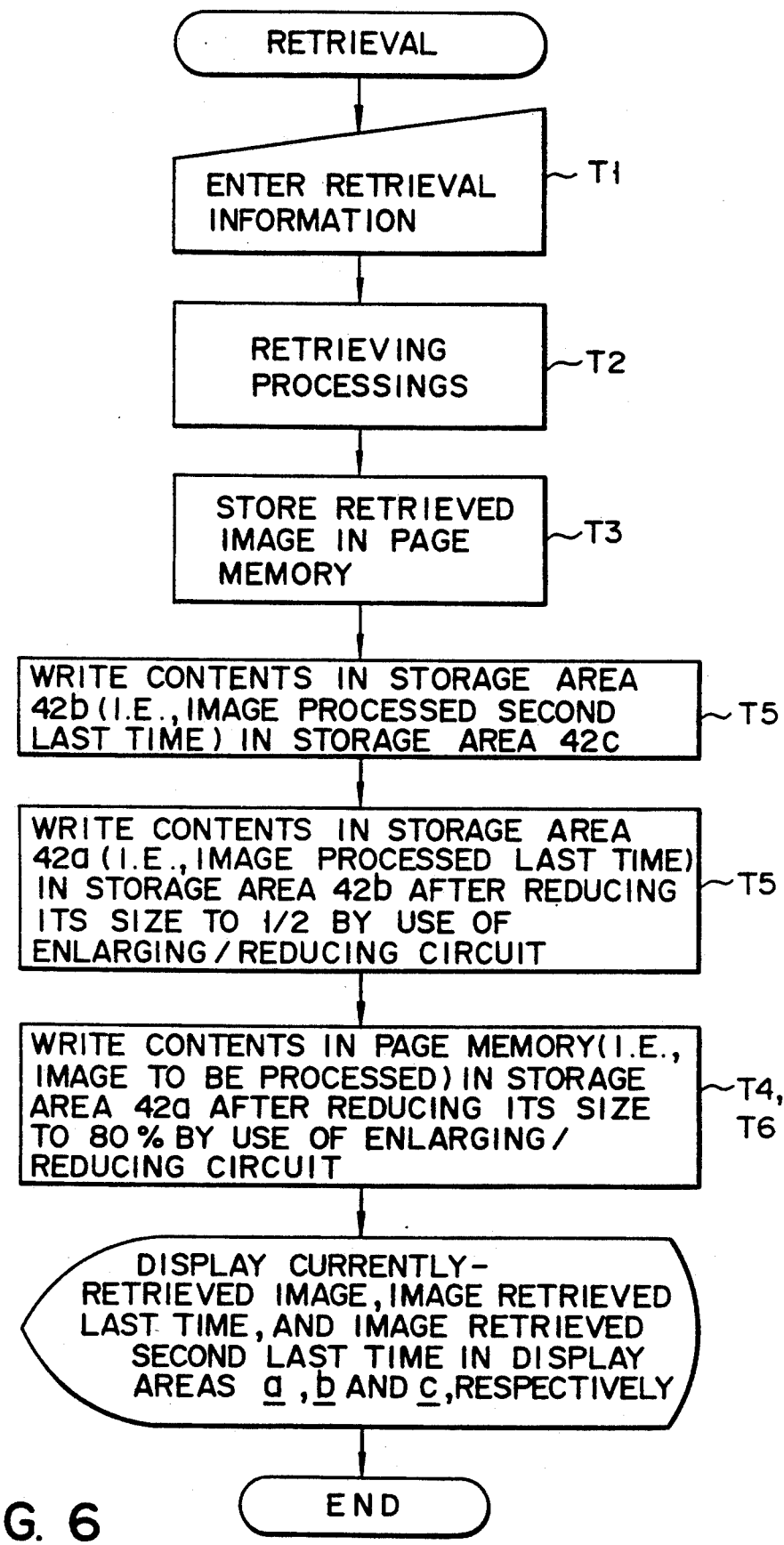
FIG. 6 is a flow chart explaining an image retrieving operation.

Next, a description will be given, with reference to the flow chart shown in FIG. 6, as to how an image is retrieved from optical disk 20. First, by use of keyboard 23, the operator sets the apparatus in the retrieving mode and enters retrieval information corresponding to the image which the operator wants to retrieve (Step T1). CPU 34 compares the retrieval information entered by the operator with the retrieval information stored on magnetic disk 26, so as to check whether or not magnetic disk 26 contains the retrieval information corresponding to the entered retrieval information (Step T2). If it is found out that magnetic disk 26 contains the corresponding retrieval information, CPU 34 reads out the logical address corresponding to the entered retrieval information, and calculates both the physical track address and physical sector address corresponding to the read-out logical address. On the basis of the calculated addresses, optical disk device 22 reproduces the image which is to be output from optical disk 20. CPU 34 supplies the image reproduced in units of one scanning line (the image is in the form of compressed data) from optical disk device 22 to compression/expansion circuit 50, for the purpose of band expansion; and the expanded image is further supplied from compression/expansion circuit 50 to page memory 40 (Step T3). The image stored in page memory 40 is reduced in size at a reducing rate of 80% by enlarging/reducing circuit 46, and is then supplied to display memory 42. As a result, the image is stored in storage area 42a corresponding to display area a of display memory 42 (Step T4). Therefore, display control section 44 displays, in display area a of CRT display device 24, the image stored in storage area 42a of display memory 42.

If storage area 42a already stores an image prior to the above-mentioned retrieving operation, CPU 34 supplies a copy command to display control section 44 before the image in page memory 40 is output to display memory 42. In response to the copy command, display control section 44 produces a copy of the image retrieved immediately before that one last previously retrieved and stored in storage area 42b, and stores the copy in storage area 42c corresponding to display area c. Next, CPU 34 causes the image retrieved last time and stored in storage area 42a to be reduced in size to ½ by enlarging/reducing circuit 46 and causes the size-reduced image to be stored in storage area 42b (Step T5). Succeedingly, the image stored in page memory 40 is reduced at a size-reducing rate of 80% by enlarging/reducing circuit 46 and is then output to display memory 42. As a result, the image to be edited is stored in storage area 42a corresponding to display area a of display memory 42 (Step T6).

Accordingly, display control section 44 causes the contents in storage areas 42a, 42b and 42c to be shown in display areas a, b and c of CRT display device 24, respectively.

In the above fashion, the image to be edited is shown in display area a, and the image last retrieved and the image retrieved immediately theretofore are shown on display areas b and c, respectively, at a reducing rate of 50%. Since the image to be edited is displayed together with the previously-retrieved images, the operator readily knows what he retrieved previously. Therefore, the apparatus of the present invention is easy to use.

The images to be stored or written in storage areas 42b and 42c of display memory 42 are supplied not from page memory 40 but from display memory 42, and the image to be stored or written in storage area 42a is supplied from page memory 40. Therefore, page memory 40 can constantly store images of 400 ppi of A3 size.

During an image editing operation, the operator may feel it necessary to retrieve a given image and select part of the given image. The operator may further feel it necessary to rotate or enlarge the given image. In such cases, newly-produced images are processed in the same manner as mentioned above. Therefore, the image under the editing operation is always shown in display area a, and the image last edited and the image edited immediately theretofore are shown in display areas b and c, respectively. Thus, the operator can readily know the previously-edited images in relation to the image which is being edited.

As mentioned above, the apparatus of the present invention enables not only the currently-edited image but also the previously-edited images (namely, the image last edited time and the image edited immediately theretofore) to be shown on the same screen. Therefore, it is easy for the operator to know how the image-editing operation or the image-retrieving operation has been performed until then. Since the operator easily understands the context of the image which he is editing, the apparatus of the present invention is easy to use.

The CRT display device employed in the apparatus of the present invention has a square display screen. When either a vertically-longer image or a laterally-longer image is displayed on the square screen, efficient use can be made of the remaining regions of the display screen.

In the above-mentioned embodiment, the second display area is adapted to show an image obtained by reducing the size of the image previously shown in the first display area. However, the present invention is not limited to this, and the second display area may be adapted to show an image obtained by enlarging the image, or a part thereof, shown in the first display area.

In the above-mentioned embodiment, the display region A has three display area a, b and c. However, the number of display areas is not limited to three; it may be determined arbitrarily as long as at least two display areas are provided. In addition, the image size-changing rates are not limited to 50% and 80%, as in the above embodiment; they may be determined freely. For example, the image size-changing rates may exceed 100%, to obtain an enlarged image. Further, if the image stored in one of two storage areas is changed in size for display, the image stored the other storage area may be displayed without being changed in size, i.e., at a image size of 100%. Moreover, the entirety display region need not have a square shape, but may have a rectangular shape, for example.

As detailed above, the present invention has provided an image processing apparatus which enables not only a currently-processed image but also previously-processed images to be shown on the same display screen of the display means, and which is therefore easy to use.

What is claimed is:

1. An image processing apparatus, comprising:

first memory means for storing at least three distinct images;

second memory means for storing at least three distinct retrieval information used for identifying each of the distinct images stored in the first memory means;

means for inputting retrieval information to the second memory means.

means for outputting from the first memory means an image that is identified by the inputted retrieval information that corresponds to one of the retrieval information stored in the second memory means;

page memory means for temporarily storing the identified image which is output from the first memory means;

means for displaying images, the display means including a square entirely display region having first and second rectangular display areas and a third rectangular display area that is wider than either the first or second rectangular display areas, the first, second and third rectangular display areas being arranged in the square entirety display region, with a longer side of the third rectangular display area being parallel to longer sides of the first and second display areas;

display memory means for temporarily storing images which are to be displayed on the display means, said display memory means including contents of first, second and third storage areas having storage capacities corresponding to the first, second and third rectangular display areas, respectively, the display memory means being connected to the display means and page memory means;

magnifying means for magnifying images which are to be displayed on the display means, the magnifying means including means for magnifying the image temporarily stored in the page memory means with a magnification corresponding to the storage capacity of the third storage area, means for magnifying an image stored as the contents of the third storage area, upon detection of such image, with a magnification corresponding to the storage capacity of the second storage area, and means for magnifying an image stored as the contents of the second storage area, upon detection of such image, with a magnification corresponding to the storage capacity of the first storage area;

transferring means for transferring the image magnified to the third storage area capacity from the page memory means to the contents of the third storage area, for transferring the image the third storage area to the contents of the second storage area, and for transferring the image magnified to the first storage area capacity from the contents of the second storage area to the contents of the first storage area; and means for simultaneously displaying the contents of the first, second and third storage areas on the first, second and third rectangular display areas, respectively.

* * * * *

UNITED STATES PATENT AND TRADEMARK OFFICE
CERTIFICATE OF CORRECTION

PATENT NO. : 5,199,102
DATED : March 30, 1993
INVENTOR(S) : Hiroshi Sakuragi

It is certified that error appears in the above-indentified patent and that said Letters Patent is hereby corrected as shown below:

Claim 1, column 7, line 38, change "means." to --means;--.

Claim 1, column 8, line 2, change "entirely" to --entirety--.

Claim 1, column 8, line 36, "image" should be followed by --magnified to the second storage area capacity from the contents of--.

Signed and Sealed this

Fifteenth Day of March, 1994

Attest:

BRUCE LEHMAN

Attesting Officer   Commissioner of Patents and Trademarks